(12) United States Patent
Kiik et al.

(10) Patent No.: US 12,060,714 B2
(45) Date of Patent: Aug. 13, 2024

(54) ROOFING MATERIAL

(71) Applicant: BMIC LLC, Dallas, TX (US)

(72) Inventors: Matti Kiik, Richardson, TX (US);
Michael L. Bryson, Independence, MO (US); Paul G. Wilson, Waxahachie, TX (US); Margie A. Beerer, Ennie, TX (US); Olan Leitch, Bakersfield, CA (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/473,977

(22) Filed: Sep. 25, 2023

(65) Prior Publication Data

US 2024/0011294 A1 Jan. 11, 2024

Related U.S. Application Data

(63) Continuation of application No. 17/314,788, filed on May 7, 2021, now Pat. No. 11,802,408, which is a
(Continued)

(51) Int. Cl.
*B32B 3/10* (2006.01)
*B32B 5/02* (2006.01)
(Continued)

(52) U.S. Cl.
CPC .................. *E04D 1/28* (2013.01); *B32B 5/022* (2013.01); *C09D 195/00* (2013.01); *E04D 1/12* (2013.01);
(Continued)

(58) Field of Classification Search
None
See application file for complete search history.

(56) References Cited

U.S. PATENT DOCUMENTS

RE16,621 E 5/1927 Busha
RE16,832 E 12/1927 O'Dell
(Continued)

FOREIGN PATENT DOCUMENTS

EP 3115524 A1 1/2017

OTHER PUBLICATIONS

Houston Restoration Services: Experienced Roofers Houston TX—Houston Roofing | "Roofing That Beats the Weather" | http://www.qualityroofertx.com/houston-roofing/roofing-thal-beats-lhe-weather.hlml, downloaded Mar. 16, 2020.
(Continued)

*Primary Examiner* — Christopher M Polley
(74) *Attorney, Agent, or Firm* — Greenberg Traurig, LLP (57) ABSTRACT

A roofing material is provided having an asphalt-coated mat or felt made up of or in combinations of fiberglass, polyester, nylon, cotton, cellulosic fibers or materials, polyethylene, polypropylene, co-polymers, melamine, phenolic, acrylics, polycarbonate, carbon fiber, clay, metallic in woven, non-woven, strands or sheets, styrene compounds, rubber, silk, leather, or wool in a woven, non-woven, or solid form. The surfacing materials can be made up of or in combination minerals, plastic particles or film, metal particles or film, cement particles, clay particles, paints, coatings, glass, ceramics, wood, wood fiber, or composite materials.

20 Claims, 2 Drawing Sheets

Related U.S. Application Data continuation of application No. 16/680,263, filed on Nov. 11, 2019, now Pat. No. 11,002,015, which is a continuation of application No. 16/546,464, filed on Aug. 21, 2019, now Pat. No. 10,995,495, which is a continuation of application No. 14/606,666, filed on Jan. 27, 2015, now Pat. No. 9,845,602.

(60) Provisional application No. 61/931,828, filed on Jan. 27, 2014.

(51) Int. Cl.
| | | |
|---|---|---|
| *C09D 195/00* | (2006.01) | |
| *E04D 1/12* | (2006.01) | |
| *E04D 1/28* | (2006.01) | |
| *B32B 17/02* | (2006.01) | |
| *E04D 1/00* | (2006.01) | |
| *E04D 5/02* | (2006.01) | |

(52) U.S. Cl.
CPC .......... *B32B 17/02* (2013.01); *B32B 2262/101* (2013.01); *B32B 2419/06* (2013.01); *E04D 2001/005* (2013.01); *E04D 5/02* (2013.01); *Y10T 428/24802* (2015.01)

(56) References Cited

U.S. PATENT DOCUMENTS

| | | |
|---|---|---|
| 2,129,833 A | 9/1938 | Fradette |
| 2,161,440 A | 6/1939 | Venrick |
| 3,138,897 A | 6/1964 | McCorkle |
| 3,190,040 A | 6/1965 | Theobald |
| 3,252,257 A | 5/1966 | Price et al. |
| 4,738,884 A | 4/1988 | Algrim |
| H788 H | 6/1990 | Schneider, Jr. |
| 5,000,826 A | 3/1991 | Kitano |
| 5,394,672 A | 3/1995 | Seem |
| 5,822,943 A | 10/1998 | Frankoski et al. |
| 5,950,387 A | 9/1999 | Stahl et al. |
| D417,513 S | 12/1999 | Blanpied |
| 6,471,812 B1 | 10/2002 | Thompson et al. |
| 6,516,572 B1 | 2/2003 | Nowacek et al. |
| 6,804,919 B2 | 10/2004 | Railkar |
| 6,813,866 B2 | 11/2004 | Naipawer, III |
| 6,851,240 B2 | 2/2005 | Peng et al. |
| 6,936,239 B2 | 8/2005 | Kiik et al. |
| 6,968,662 B2 | 11/2005 | Rodrigues |
| 7,082,724 B2 | 8/2006 | Railkar et al. |
| 7,172,678 B2 | 2/2007 | Canfield et al. |
| 7,219,476 B2 | 5/2007 | Akins et al. |
| 7,272,915 B2 | 9/2007 | Peng |
| D554,275 S | 10/2007 | Sieling et al. |
| 7,320,767 B2 | 1/2008 | Edge et al. |
| 7,442,658 B2 | 10/2008 | Rodrigues et al. |
| 7,448,177 B2 | 11/2008 | McClintick |
| 7,454,873 B2 | 11/2008 | McClintick |
| 7,582,155 B2 | 9/2009 | Mehta et al. |
| D611,620 S | 3/2010 | Kalkanoglu et al. |
| 7,805,905 B2 | 10/2010 | Rodrigues et al. |
| 7,833,371 B2 | 11/2010 | Binkley et al. |
| 7,836,654 B2 | 11/2010 | Belt et al. |
| 7,851,051 B2 | 12/2010 | DeJarnette et al. |
| 7,861,631 B2 | 1/2011 | Freshwater et al. |
| 7,900,266 B1 | 3/2011 | Longcor, IV |
| 7,928,023 B2 | 4/2011 | Canfield et al. |
| 8,006,457 B2 | 8/2011 | Binkley et al. |
| 8,033,072 B2 | 10/2011 | McClintick |
| 8,127,514 B2 | 3/2012 | Binkley et al. |
| 8,156,704 B2 | 4/2012 | Belt et al. |
| 8,181,413 B2 | 5/2012 | Belt et al. |
| 8,226,790 B2 | 7/2012 | Rodrigues et al. |
| D665,103 S | 8/2012 | Rodrigues et al. |
| D665,104 S | 8/2012 | Rodrigues et al. |
| 8,240,100 B2 | 8/2012 | Kalkanoglu et al. |
| 8,240,102 B2 | 8/2012 | Belt et al. |
| D666,744 S | 9/2012 | Rodrigues et al. |
| D666,745 S | 9/2012 | Rodrigues et al. |
| D666,746 S | 9/2012 | Rodrigues et al. |
| D666,747 S | 9/2012 | Rodrigues et al. |
| 8,297,020 B1 | 10/2012 | Swanson |
| D670,407 S | 11/2012 | Leitch |
| D670,408 S | 11/2012 | Leitch |
| D670,409 S | 11/2012 | Leitch |
| D670,825 S | 11/2012 | Leitch |
| D670,826 S | 11/2012 | Leitch |
| D670,827 S | 11/2012 | Leitch |
| 8,302,358 B2 | 11/2012 | Kalkanoglu |
| 8,316,608 B2 | 11/2012 | Binkley et al. |
| 8,381,489 B2 | 2/2013 | Freshwater et al. |
| 8,389,103 B2 | 3/2013 | Kiik et al. |
| 8,397,460 B2 | 3/2013 | Rodrigues et al. |
| 8,430,983 B2 | 4/2013 | Vermilion et al. |
| 8,535,786 B2 | 9/2013 | Schroer |
| 8,607,521 B2 | 12/2013 | Belt et al. |
| 8,623,164 B2 | 1/2014 | Belt et al. |
| 8,752,351 B2 | 6/2014 | Belt et al. |
| 8,763,339 B2 | 7/2014 | Bryson et al. |
| 8,813,453 B2 | 8/2014 | Kalkanoglu et al. |
| 8,863,388 B2 | 10/2014 | Aschoff et al. |
| 8,978,332 B2 | 3/2015 | Leitch |
| 8,984,835 B2 | 3/2015 | Kalkanoglu |
| 8,991,130 B2 | 3/2015 | Belt et al. |
| 9,010,058 B2 | 4/2015 | Dejarnette et al. |
| 9,021,760 B2 | 5/2015 | Kiik et al. |
| 9,057,194 B2 | 6/2015 | Jenkins et al. |
| 9,121,178 B2 | 9/2015 | Belt et al. |
| 9,140,012 B1 | 9/2015 | Leitch et al. |
| 9,157,236 B2 | 10/2015 | Jenkins |
| 9,187,903 B1 | 11/2015 | Buzza |
| 9,212,487 B2 | 12/2015 | Kiik et al. |
| D747,007 S | 1/2016 | Leitch |
| D747,501 S | 1/2016 | Leitch |
| D749,240 S | 2/2016 | Rodrigues et al. |
| D750,810 S | 3/2016 | Buzza |
| 9,279,255 B2 | 3/2016 | Bryson et al. |
| 9,290,945 B2 | 3/2016 | Beerer et al. |
| 9,340,371 B2 | 5/2016 | Mishler |
| D760,924 S | 7/2016 | Rodrigues et al. |
| D760,925 S | 7/2016 | Rodrigues et al. |
| D761,445 S | 7/2016 | Rodrigues et al. |
| D761,446 S | 7/2016 | Rodrigues et al. |
| D761,447 S | 7/2016 | Anderson et al. |
| 9,399,870 B2 | 7/2016 | Leitch et al. |
| 9,399,871 B2 | 7/2016 | Leitch et al. |
| D762,879 S | 8/2016 | Leitch |
| D762,880 S | 8/2016 | Leitch |
| D762,881 S | 8/2016 | Leitch |
| D763,468 S | 8/2016 | Leitch et al. |
| D763,470 S | 8/2016 | Leitch |
| D763,471 S | 8/2016 | Leitch |
| D764,076 S | 8/2016 | Leitch |
| D764,687 S | 8/2016 | Anderson et al. |
| D765,271 S | 8/2016 | Anderson et al. |
| D765,273 S | 8/2016 | Leitch et al. |
| D765,274 S | 8/2016 | Leitch et al. |
| 9,404,260 B2 | 8/2016 | Leitch |
| 9,410,323 B1 | 8/2016 | Leitch |
| 9,416,539 B2 | 8/2016 | Duque et al. |
| D765,885 S | 9/2016 | Leitch et al. |
| D765,886 S | 9/2016 | Leitch et al. |
| D765,887 S | 9/2016 | Leitch et al. |
| D765,888 S | 9/2016 | Leitch et al. |
| D766,466 S | 9/2016 | Leitch |
| D766,467 S | 9/2016 | Leitch |
| D766,468 S | 9/2016 | Leitch |
| D766,469 S | 9/2016 | Leitch et al. |
| D767,172 S | 9/2016 | Leitch |
| D767,272 S | 9/2016 | Gibson |
| D769,472 S | 10/2016 | Leitch |
| D769,473 S | 10/2016 | Rodrigues et al. |
| 9,458,633 B2 | 10/2016 | McGraw et al. |
| 9,464,439 B2 | 10/2016 | Buzza |
| D774,215 S | 12/2016 | Duque et al. |

(56) References Cited

U.S. PATENT DOCUMENTS

| | | | |
|---|---|---|---|
| D774,664 S | 12/2016 | Rodrigues et al. | |
| 9,523,202 B2 | 12/2016 | Anderson et al. | |
| D776,303 S | 1/2017 | Duque et al. | |
| 9,540,821 B2 | 1/2017 | Houchin et al. | |
| 9,605,434 B2 | 3/2017 | Belt et al. | |
| 9,624,670 B2 | 4/2017 | Belt et al. | |
| 9,657,478 B2 | 5/2017 | Belt et al. | |
| D793,584 S | 8/2017 | Leitch | |
| 9,739,062 B2 | 8/2017 | Leitch | |
| 9,752,324 B2 | 9/2017 | Leitch | |
| 9,758,970 B2 | 9/2017 | Grubka et al. | |
| D799,271 S | 10/2017 | Pogue et al. | |
| D804,687 S | 12/2017 | Duque et al. | |
| D805,221 S | 12/2017 | Leitch | |
| 9,845,602 B2 | 12/2017 | Kiik et al. | |
| 9,856,649 B1 | 1/2018 | Selway | |
| 9,890,540 B2 | 2/2018 | Weitzer | |
| 10,009,929 B1 | 6/2018 | Zhou et al. | |
| D825,081 S | 8/2018 | Rodrigues et al. | |
| D827,158 S | 8/2018 | Duque et al. | |
| D827,159 S | 8/2018 | Anderson et al. | |
| 10,060,132 B2 | 8/2018 | Beerer et al. | |
| D827,864 S | 9/2018 | Rodrigues et al. | |
| D827,865 S | 9/2018 | Rodrigues et al. | |
| D827,866 S | 9/2018 | Rodrigues et al. | |
| D827,867 S | 9/2018 | Rodrigues et al. | |
| D827,868 S | 9/2018 | Rodrigues et al. | |
| D829,935 S | 10/2018 | Duque et al. | |
| D831,233 S | 10/2018 | Anderson et al. | |
| D834,220 S | 11/2018 | Duque et al. | |
| 10,180,001 B2 | 1/2019 | Leitch | |
| 10,189,656 B2 | 1/2019 | Belt et al. | |
| 10,195,640 B2 | 2/2019 | Svec | |
| 10,196,821 B2 | 2/2019 | Anderson et al. | |
| 10,308,448 B2 | 6/2019 | Belt et al. | |
| 10,315,863 B2 | 6/2019 | Belt et al. | |
| 10,322,889 B2 | 6/2019 | Belt et al. | |
| D856,538 S | 8/2019 | Duque et al. | |
| D856,539 S | 8/2019 | Duque et al. | |
| D857,931 S | 8/2019 | Leitch | |
| D857,932 S | 8/2019 | Leitch | |
| 10,415,247 B2 | 9/2019 | Kiik et al. | |
| 10,428,525 B2 | 10/2019 | Belt et al. | |
| 10,995,495 B2 | 5/2021 | Kiik et al. | |
| 11,002,015 B2 | 5/2021 | Kiik et al. | |
| D943,642 S | 2/2022 | Svec et al. | |
| 11,352,792 B2 | 6/2022 | Boss et al. | |
| 11,377,731 B2 | 7/2022 | Chikaishi et al. | |
| D973,583 S | 12/2022 | Horikoshi et al. | |
| 2001/0055680 A1 | 12/2001 | Kiik et al. | |
| 2003/0124292 A1 | 7/2003 | Unterreiter | |
| 2004/0083674 A1 | 5/2004 | Kalkanoglu et al. | |
| 2004/0123932 A1 | 7/2004 | Sanger | |
| 2004/0258883 A1 | 12/2004 | Weaver | |
| 2005/0130519 A1* | 6/2005 | Rodrigues | B32B 27/34 442/180 |
| 2005/0178428 A1 | 8/2005 | Laaly et al. | |
| 2005/0202197 A1 | 9/2005 | Mohseen et al. | |
| 2005/0252141 A1* | 11/2005 | Kerkar | E04D 1/26 52/551 |
| 2006/0269713 A1 | 11/2006 | Zuege et al. | |
| 2008/0134612 A1 | 6/2008 | Koschitzky | |
| 2009/0139175 A1 | 6/2009 | Todd et al. | |
| 2009/0220720 A1 | 9/2009 | Mohseen et al. | |
| 2010/0170169 A1 | 7/2010 | Railkar et al. | |
| 2010/0173110 A1 | 7/2010 | Wiercinski et al. | |
| 2011/0041446 A1 | 2/2011 | Stephens et al. | |
| 2011/0086214 A1 | 4/2011 | Rockwell | |
| 2011/0223384 A1 | 9/2011 | Whitaker et al. | |
| 2012/0047838 A1 | 3/2012 | Kalkanoglu et al. | |
| 2013/0025225 A1 | 1/2013 | Vermilion et al. | |
| 2013/0068279 A1 | 3/2013 | Buller et al. | |
| 2013/0095293 A1* | 4/2013 | Boss | B32B 38/08 442/64 |
| 2014/0147611 A1 | 5/2014 | Ackerman, Jr. | |
| 2014/0283468 A1 | 9/2014 | Weitzer | |
| 2015/0089895 A1 | 4/2015 | Leitch | |
| 2015/0176282 A1 | 6/2015 | Baker | |
| 2016/0369509 A1 | 12/2016 | Leitch et al. | |
| 2017/0314271 A1 | 11/2017 | Sutton et al. | |
| 2018/0038108 A1 | 2/2018 | Aschenbeck et al. | |
| 2018/0363302 A1 | 12/2018 | Beerer et al. | |
| 2019/0256304 A1 | 8/2019 | Belt et al. | |
| 2020/0040582 A1 | 2/2020 | Boss et al. | |
| 2021/0108416 A1 | 4/2021 | Aschenbeck et al. | |

OTHER PUBLICATIONS

Trudefinition™ Duration® shingles with Surenail® technology | https:/lwww2.owenscorning.com/lilerature/pdfs/10013980.pdf.

Installation instructions east asphalt shingles | https://bpcan.com/wp-conlenl/uploads/2017/05/d-6013bpmode-de-pose-bardeauxeneasl. pdf, downloaded Mar. 18, 2020.

RegencyTM CRC Roofing Excellence | Regency Brochure | hllps://www.weblrack-cgs.ca/producifiles/12824/CRC-Regency-Brochure.pdf.

Landmark™ Series and Landmark™ TL; CertainTeed Website; https://www.certainteed.com/residential-roofing/products/landmark-tl, downloaded Mar. 19, 2020.

What Makes the Windsor® a Designer Shingle! Malarkey Roofing Products | http://malarkeyroofing.com/blog/delail/whal-makes-the-windsor-a-designer-shingle, downloaded Mar. 18, 2020.

"CertainTeed; Landmark Woodscape Series Designer Shingles" brochure, 22 pgs., Code No. 20-20-1833; 11/09 CertainTeed Corporation.

"Highlander-CS; Laminated Architectural Shingle" brochure, 2 pgs., Malarkey Roofing Products; 9/13.

"Owens Corning: Oakridge Shingles featuring Artisan Colors" brochure, 10 pgs., Owens Corning Roofing and Asphalt, LLC, Pub. No. 10017748, Nov. 2012.

"Tamko Building Products: Heritage Premium Laminated Asphalt Shingles, Heritage Laminated Asphalt Shingles" brochure, Tamko Building Products, Inc. 2014.

"IKO Setting the Standard: IKO Sales International: Bitumen Shingles", application guide, 22/02-E/RU/RO/H-02/05.

"CRC Roofing Excellence: Regency—Limited Lifetime Architectural Shingles", brochure, 4 pgs., MC3L044-10/15.

GAF Timberline; Lifetime High Definition Shingles brochure; 2011, 13 pgs.

Trudefinition™ Duration® shingles with SURENAIL® technology | https://www2.owenscorning.com/literature/pdfs/10013980.pdf.

Roofing Excellence | Regency Brochure | https://www.weblrack-cgs.ca/produclfiles/12824/CRC-Regency-Brochure.pdf.

"Owens Corning Roofing Introduces Its Next Generation of Shingles: High Performance TruDefinition Duration Series Shingles with Enhanced SureNail Technology", Feb. 1, 2012 <<https://newsroom.owenscorning.com/all-news-releases/news-details/2012/Owens-Corning-Roofing-Introduces-Its-Next-Generation-of-Shingles-High-Performance-TruDefinition-Duration-Series-Shingles-with-Enhanced-SureNail-Technology/default.aspx>>.

"Timberline High Definition", brochure, GAF Mar. 2013 #027.

* cited by examiner

ROOFING MATERIAL

CROSS REFERENCE TO RELATED APPLICATIONS

This application is a continuation of U.S. patent application Ser. No. 16/680,263, filed on Nov. 11, 2019, which is a continuation of U.S. patent application Ser. No. 16/546,464, filed on Aug. 21, 2019, now U.S. Pat. No. 10,995,495, which is a continuation of U.S. patent application Ser. No. 15/811,988, filed on Nov. 14, 2017, now, U.S. Pat. No. 10,415,247, which is a continuation of U.S. patent application Ser. No. 14/606,666, filed on Jan. 27, 2015, now U.S. Pat. No. 9,845,602, which claims priority to U.S. Provisional Application No. 61/931,828, filed on Jan. 27, 2014, the contents of all of which are incorporated herein by reference in their entireties.

FIELD OF THE DISCLOSED SUBJECT MATTER

The disclosed subject matter relates to roofing material, including roofing shingles and roll roofing, having a novel construction.

BACKGROUND

Asphalt shingles and asphalt roll roofing for decades have been limited by building codes mandating compliance with certain industry specifications. For example, the ASTM D3462 specification, "Standard Specification for Asphalt Shingles made from Glass Felt and Surfaced with Mineral Granules," is one such industry standard for asphalt shingles and asphalt roll roofing.

The D3462 specification is quite limited, however, in the acceptable materials and construction parameters for producing roofing material. D3462 requires a fiberglass mat with a minimum weight, asphalt content, mineral surfacing, and mineral fillers mixed in the asphalt with a maximum percentage. For example, the exposed surface material and the headlap surface material must be composed of mineral granules, and the back surface covering material must be composed of a suitable material such as sand, talc, or mica. Additionally, the overall shingle under D3462 has a minimum shingle mass requirement. The entirety of the D3462 specification is hereby incorporated by reference. Flexibility in shingle design and manufacture has thus been somewhat limited.

Recently, however, the International Code Compliance Evaluation Service has approved an alternative shingle specification (ICC-ES AC438). The primary material requirement of ICC-ES AC438 is that shingles contain asphalt. AC438 focuses on shingle performance, rather than materials, and contains a number of shingle performance requirements, including those of the ASTM standards.

There is therefore a need for asphalt shingles constructed of alternative materials other than those required by the D3462 specification. The presently disclosed subject matter satisfies these and other needs.

SUMMARY

The purpose and advantages of the disclosed subject matter will be set forth in and are apparent from the description that follows, and will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes a roofing material using felts or mats of different compositions and alternatives to mineral surfacing materials. This roofing material meets the ICC-ES AC438 standard, including the physical and performance requirements. The disclosed roofing material can be made from lighter-weight and lower-cost materials, and will perform as well or better than existing shingles and roll roofing.

In accordance with another aspect of the disclosed subject matter, a roofing material is provided comprising a mat, comprising top and back surfaces, at least one asphalt layer, disposed on the mat, comprising asphalt and an asphalt filler, an exposed surface covering material disposed on an exposed area of the top surface, and a headlap surface covering material disposed on a headlap area of the top surface, wherein the roofing material satisfies the performance requirements of the AC438 standard, including, wind resistance, fire rating, weather resistance, temperature cycling, wind-driven rain resistance, and breaking strength after weathering.

In further embodiments of the disclosed subject matter, the roofing material mat comprises one or more of fiberglass, polyester, nylon, cotton, cellulosic fibers or materials, polyethylene, polypropylene, co-polymers, melamine, phenolic, acrylics, polycarbonate, carbon fiber, clay, metallic in woven, non-woven, strands or sheets, styrene compounds, rubber, silk, leather, and wool in a woven, non-woven, or solid form.

In further embodiments of the disclosed subject matter, the roofing material exposed surface covering material comprises one or more of minerals, plastic particles or film, metal particles or film, cement particles, clay particles, paints, coatings, glass, ceramics, wood, wood fiber, and composite materials.

In further embodiments of the disclosed subject matter, the roofing material headlap surface covering material comprises one or more of minerals, plastic particles or film, metal particles or film, cement particles, clay particles, paints, coatings, glass, ceramics, wood, wood fiber, and composite materials.

In further embodiments of the disclosed subject matter, the roofing material back surface covering material comprises one or more of sand, coal slag, and polymer film.

It is to be understood that the foregoing general description and the following detailed description and drawings are only examples and are provided for purpose of illustration and not intended to limit the scope of the disclosed subject matter in any way.

The accompanying drawings, which are incorporated in and constitute part of this specification, are included to illustrate and provide a further understanding of the devices of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which.

DETAILED DESCRIPTION

Reference will now be made in detail to embodiments of the disclosed subject matter, an example of which is illustrated in the accompanying drawings. The disclosed subject matter will be described in conjunction with the detailed description of the system.

In accordance with the disclosed subject matter, the use of different felts to make an asphalt shingle can be made up of or in combinations of: fiberglass, polyester, nylon, cotton, cellulosic fibers or materials, polyethylene, polypropylene, co-polymers, melamine, phenolic, acrylics, polycarbonate, carbon fiber, clay, metallic in woven, non-woven, strands or sheets, styrene compounds, rubber, silk, leather, or wool in a woven, non-woven, or solid form. The surfacing materials can be made up of or in combination minerals, plastic particles or film, metal particles or film, cement particles, clay particles, paints, coatings, glass, ceramics, wood, wood fiber, or composite materials.

The various embodiments of the disclosed subject matter, described in detail below, are constructed with one common raw material, asphalt. Other materials, however, can vary. For example, the felt that is the base of an asphalt shingle can be a polypropylene woven material coated on the top and back surface with an asphaltic compound containing finely ground mineral stabilizer. The back of the shingle can be coated with a crushed waste cement product that keeps the shingles from sticking together in the bundle before being applied to the roof. On the top portion of the single the exposure area of the shingle can be covered with a colored crushed brick material and the non-exposure area of the shingle can be covered with a mineral surfacing material such as limestone.

In further embodiments of the disclosed subject matter, the felt can be a fiberglass non-woven mat coated on both the top and bottom surface with the filled asphalt coating. The back surface and the non-exposure area of the top of the shingles can be covered with a crushed expanded clay material. The exposed portion of the shingle can be covered with a ceramic coated aluminum flake material.

In further embodiments of the disclosed subject matter the felt can be made with a combination of fiberglass and aluminum strands and can be coated on both top and back surfaces with a filled asphalt coating. The back surface may be covered with a mineral surfacing material. The top of the shingle's exposed surface may be coated with a reduced size colored ceramic coated mineral surfacing granule mixed with a antimicrobial polypropylene granule. The non-exposed portion of the top side of the shingle may be covered with a mineral surfacing material.

In further embodiments of the disclosed subject matter the felt can be made with a fiberglass and can be coated on both top and back surfaces with a filled asphalt coating. The back side of the felt can be covered with a polyethylene film. The top surface can be coated with a filled asphalt coating. In some embodiments, the back surface covering material can be omitted. The top of the shingle's surface can be covered with a crushed waste concrete and the exposure can be painted.

Figure 1:
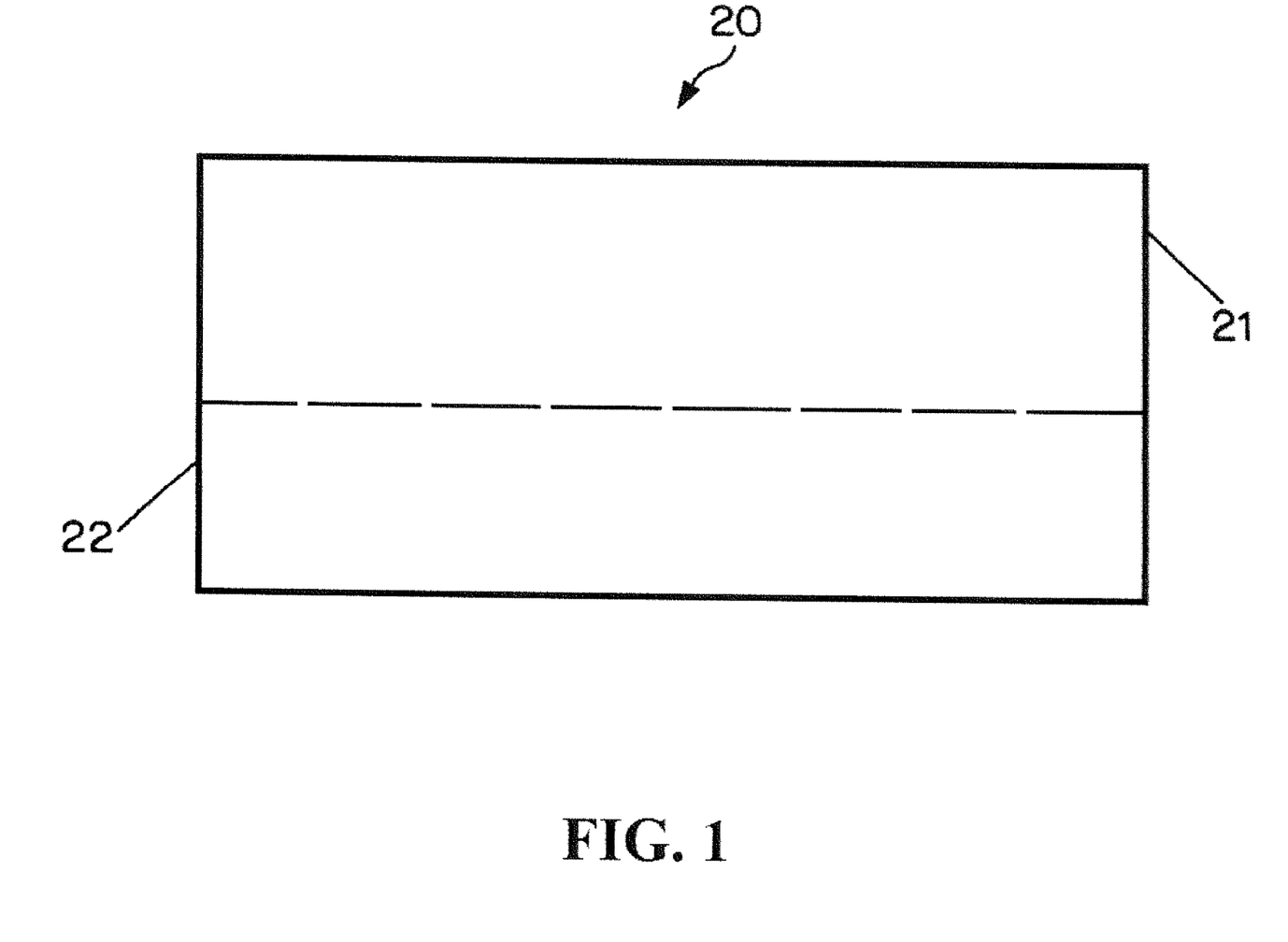
FIG. 1 is a perspective view of a roofing material in accordance with the present disclosure.

Solely for the purpose of illustration, FIG. 1 depicts an embodiment of a roofing shingle in accordance with the present disclosure. Particularly, and as illustrated, the roofing shingle 20 can comprise a headlap section 21 and a buttlap (or exposed) section 22. The headlap section 21 is the portion of the shingle that is covered by an overlaid shingle after installation. The buttlap section is the portion of the shingle that is exposed after installation. In FIG. 1, the dashed line indicates the demarcation between these two sections.

Figure 2:
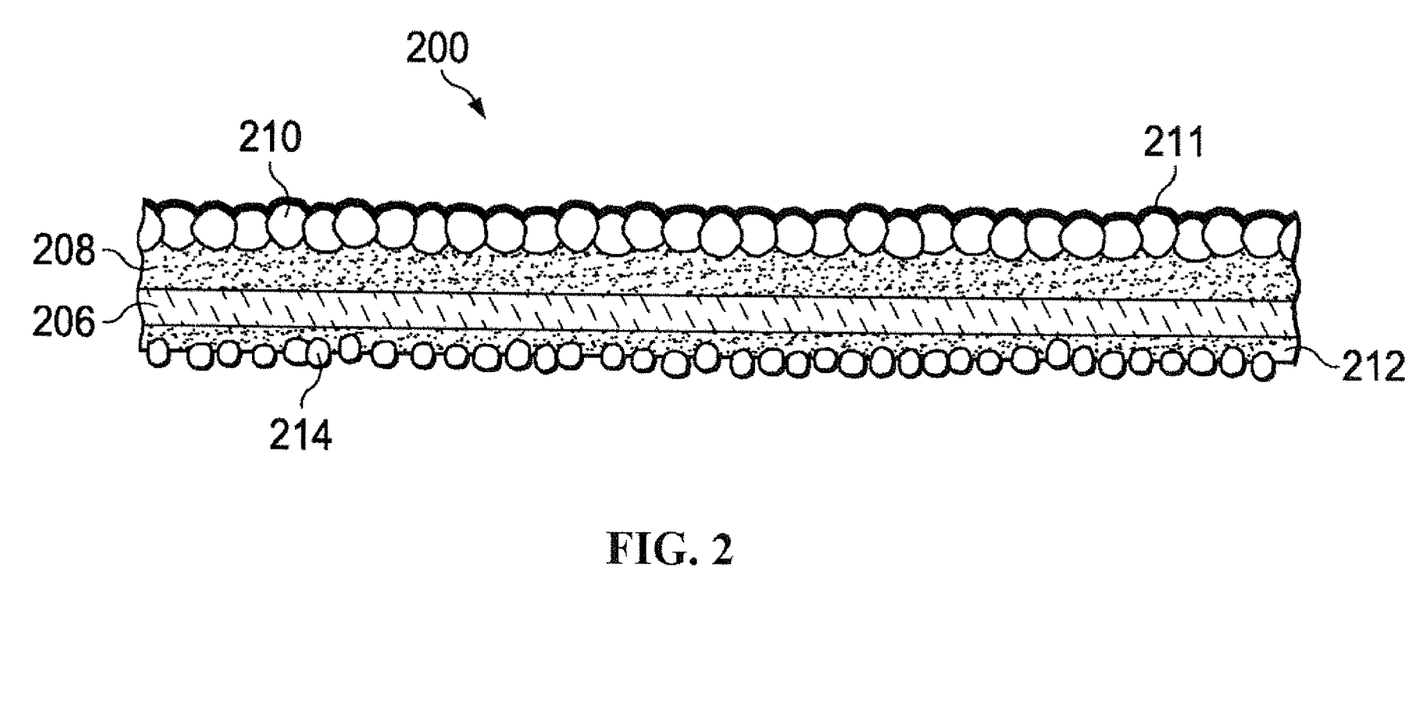
FIG. 2 is a cross-sectional view of a roofing material in accordance with the present disclosure.

FIG. 2 depicts an embodiment of a roofing material 200 in accordance with the present disclosure. The roofing material 200 can comprise a mat or felt 206, an asphalt filled coating 208, which can be disposed on top of the mat 206, a second asphalt filled coating 212, which can be disposed beneath the mat 206. A layer of top surface material 210 can be disposed over the first asphalt filled coating 208. A layer of back surface material 214 can be disposed over the second asphalt filled coating 212. The top surface layer 210 can be subdivided into headlap and buttlap sections as depicted in FIG. 1. The headlap and buttlap sections of the top surface layer 210 can be comprised of the same or different materials, as described in more detail below. Optionally, a layer of color coating 211 (e.g., paint) can be disposed on top of the top surface layer 210.

The examples herein are not intended to limit the scope of the disclosed subject matter. It will be understood that the configuration depicted in FIG. 1, known as a "no cut-out" or strip shingle, is just one of many well-known asphalt-based roofing products, such as three-tab shingles, laminated or architectural shingles, hip and ridge shingles, and roll roofing. These and other such products are all compatible with the disclosed subject matter. Similarly, the configuration depicted in FIG. 2 is an exemplary layout, but not intended to be limiting or exhaustive. A variety of well-known roofing material configurations can be used with the disclosed subject matter.

Although some of the materials described herein are previously known for use in shingles, such as in the D3462 specification, the combinations as described herein are unique and offer improvements over known combinations. For example, many of the materials used in embodiments of the disclosed subject matter are lower-cost and/or lighter-weight than existing materials, and therefore offer previously unrealized advantages such as lower costs of production and shipping, improved ease of manufacture and installation and/or improved performance.

Example Shingles

Specific exemplary embodiments of the disclosed subject matter are provided in the tables below. The data provided in these tables are based on construction of a 36 inch by 12 inch no cut-out shingle with a 5-inch exposure, such as depicted in FIG. 1. A "square" containing 80 shingles is made up of 240 square feet of shingles and covers 100 square feet of roof at the recommended exposure. The term "wt./100 sq. ft." represents the weight of the material per 100 square feet of shingle. The term "Wt./Sq." represents the weight of the material per square. As a benchmark, an exemplary prior-art shingle constructed according to the D3462 specification is also provided.

Although the examples are provided for a no cut-out shingle for simplicity, the scope of the invention is not limited to any specific shingle configuration or other roof covering product. Moreover, the values given below are not intended to be limiting or exclusive. A person of ordinary skill in the art would understand that weights and compositions of certain materials can be varied or adjusted without a substantial change in shingle performance or quality.

TABLE 1

| Prior Art Shingle (D3462) | |
|---|---|
| Mat (felt) | |
| Material | non-woven fiberglass |
| wt./100 sq. ft. | 1.35 lbs. (min.) |
| Wt./Sq. | 3.24 lbs. |
| Asphalt | |
| wt./100 sq. ft. | 15.00 lbs. (min.) |
| Wt./Sq. | 36.00 lbs. |
| Asphalt Filler | |
| Material | limestone |
| Filler Percentage | 70% (max.) |
| Wt./Sq. | 84.00 lbs. |
| Exposed Surface Covering Material | |
| Material | grade 11 mineral granules |
| wt./100 sq. ft. | 25.00 lbs. (min.) |
| Wt./Sq. | 25.00 lbs. |
| Headlap surface covering material | |
| Material | grade 11 mineral granules |
| wt./100 sq. ft. | 25.00 lbs. (min.) |
| Wt./Sq. | 35.00 lbs. |
| Back Surface covering material | |
| Material | sand |
| wt./100 sq. ft. | no requirement |
| Wt./Sq. | 12.00 lbs. |
| Total lbs./Sq. | 195.24 lbs. |

TABLE 2

| Example 1 | |
|---|---|
| Mat (felt) | |
| Material | non-woven fiberglass |
| wt./100 sq. ft. | 1.55 lbs. |
| Wt./Sq. | 3.72 lbs. |
| Asphalt | |
| wt./100 sq. ft. | 10.50 lbs. |
| Wt./Sq. | 25.20 lbs. |
| Asphalt Filler | |
| Material | limestone |
| Filler Percentage | 65% |
| Wt./Sq. | 46.80 lbs. |
| Exposed Surface Covering Material | |
| Material | grade 18 mineral granules |
| wt./100 sq. ft. | 18.00 lbs. |
| Wt./Sq. | 18.00 lbs. |
| Headlap surface covering material | |
| Material | grade 18 mineral granules |
| wt./100 sq. ft. | 18.00 lbs. |
| Wt./Sq. | 25.20 lbs. |
| Back Surface covering material | |
| Material | sand |
| wt./100 sq. ft. | no requirement |
| Wt./Sq. | 12.00 lbs. |
| Total lbs./Sq. | 130.92 lbs. |

TABLE 3

| Example 2 | |
|---|---|
| Mat (felt) | |
| Material | spunglass polypropylene |
| wt./100 sq. ft. | 1.00 lbs. |
| Wt./Sq. | 2.40 lbs. |
| Asphalt | |
| wt./100 sq. ft. | 10.50 lbs. |
| Wt./Sq. | 25.20 lbs. |
| Asphalt Filler | |
| Material | limestone |
| Filler Percentage | 65% |
| Wt./Sq. | 46.80 lbs. |
| Exposed Surface Covering Material | |
| Material | grade 18 mineral granules |
| wt./100 sq. ft. | 18.00 lbs. |
| Wt./Sq. | 18.00 lbs. |
| Headlap surface covering material | |
| Material | grade 18 mineral granules |
| wt./100 sq. ft. | 18.00 lbs. |
| Wt./Sq. | 25.20 lbs. |
| Back Surface covering material | |
| Material | sand |
| wt./100 sq. ft. | no requirement |
| Wt./Sq. | 12.00 lbs. |
| Total lbs./Sq. | 129.60 lbs. |

TABLE 4

| Example 3 | |
|---|---|
| Mat (felt) | |
| Material | non-woven fiberglass |
| wt./100 sq. ft. | 1.55 lbs. |
| Wt./Sq. | 3.72 lbs. |
| Asphalt | |
| wt./100 sq. ft. | 10.50 lbs. |
| Wt./Sq. | 25.20 lbs. |
| Asphalt Filler | |
| Material | limestone |
| Filler Percentage | 65% |
| Wt./Sq. | 46.80 lbs. |
| Exposed Surface Covering Material | |
| Material | aluminum flakes |
| wt./100 sq. ft. | 3.00 lbs. |
| Wt./Sq. | 3.00 lbs. |
| Headlap surface covering material | |
| Material | fine mineral surfacing |
| wt./100 sq. ft. | 12.00 lbs. |
| Wt./Sq. | 16.80 lbs. |
| Back Surface covering material | |
| Material | fine coal slag |
| wt./100 sq. ft. | no requirement |
| Wt./Sq. | 8.00 lbs. |
| Total lbs./Sq. | 103.52 lbs. |

TABLE 5

Example 4

Mat (felt)

| | |
|---|---|
| Material | non-woven fiberglass |
| wt./100 sq. ft. | 1.55 lbs. |
| Wt./Sq. | 3.72 lbs. |

Asphalt

| | |
|---|---|
| wt./100 sq. ft. | 15.00 lbs. |
| Wt./Sq. | 36.00 lbs. |

Asphalt Filler

| | |
|---|---|
| Material | limestone |
| Filler Percentage | 65% |
| Wt./Sq. | 66.86 lbs. |

Exposed Surface Covering Material

| | |
|---|---|
| Material | plastic granules |
| wt./100 sq. ft. | 10.00 lbs. |
| Wt./Sq. | 10.00 lbs. |

Headlap surface covering material

| | |
|---|---|
| Material | plastic granules |
| wt./100 sq. ft. | 10.00 lbs. |
| Wt./Sq. | 14.00 lbs. |

Back Surface covering material

| | |
|---|---|
| Material | sand |
| wt./100 sq. ft. | no requirement |
| Wt./Sq. | 12.00 lbs. |
| Total lbs./Sq. | 142.58 lbs. |

TABLE 6

Example 5

Mat (felt)

| | |
|---|---|
| Material | non-woven fiberglass |
| wt./100 sq. ft. | 1.55 lbs. |
| Wt./Sq. | 3.72 lbs. |

Asphalt

| | |
|---|---|
| wt./100 sq. ft. | 15.00 lbs. |
| Wt./Sq. | 36.00 lbs. |

Asphalt Filler

| | |
|---|---|
| Material | limestone |
| Filler Percentage | 65% |
| Wt./Sq. | 66.86 lbs. |

Exposed Surface Covering Material

| | |
|---|---|
| Material | plastic & mineral granule blend |
| wt./100 sq. ft. | 20.00 lbs. |
| Wt./Sq. | 20.00 lbs. |

Headlap surface covering material

| | |
|---|---|
| Material | plastic & mineral granule blend |
| wt./100 sq. ft. | 20.00 lbs. |
| Wt./Sq. | 28.00 lbs. |

Back Surface covering material

| | |
|---|---|
| Material | sand |
| wt./100 sq. ft. | no requirement |
| Wt./Sq. | 12.00 lbs. |
| Total lbs./Sq. | 166.58 lbs. |

TABLE 7

Example 6

Mat (felt)

| | |
|---|---|
| Material | non-woven polyester |
| wt./100 sq. ft. | 1.05 lbs. |
| Wt./Sq. | 2.52 lbs. |

Asphalt

| | |
|---|---|
| wt./100 sq. ft. | 10.50 lbs. |
| Wt./Sq. | 25.20 lbs. |

Asphalt Filler

| | |
|---|---|
| Material | limestone |
| Filler Percentage | 65% |
| Wt./Sq. | 46.80 lbs. |

Exposed Surface Covering Material

| | |
|---|---|
| Material | grade 18 mineral granules |
| wt./100 sq. ft. | 18.00 lbs. |
| Wt./Sq. | 18.00 lbs. |

Headlap surface covering material

| | |
|---|---|
| Material | expanded clay granules |
| wt./100 sq. ft. | 12.00 lbs. |
| Wt./Sq. | 16.80 lbs. |

Back Surface covering material

| | |
|---|---|
| Material | fine coal slag |
| wt./100 sq. ft. | no requirement |
| Wt./Sq. | 8.00 lbs. |
| Total lbs./Sq. | 117.32 lbs. |

TABLE 8

Example 7

Mat (felt)

| | |
|---|---|
| Material | non-woven fiberglass |
| wt./100 sq. ft. | 1.55 lbs. |
| Wt./Sq. | 3.72 lbs. |

Asphalt

| | |
|---|---|
| wt./100 sq. ft. | 12.00 lbs. |
| Wt./Sq. | 28.80 lbs. |

Asphalt Filler

| | |
|---|---|
| Material | limestone |
| Filler Percentage | 65% |
| Wt./Sq. | 53.50 lbs. |

Exposed Surface Covering Material

| | |
|---|---|
| Material | grade 11 mineral granules |
| wt./100 sq. ft. | 25.00 lbs. |
| Wt./Sq. | 25.00 lbs. |

Headlap surface covering material

| | |
|---|---|
| Material | grade 11 mineral granules |
| wt./100 sq. ft. | 25.00 lbs. (min.) |
| Wt./Sq. | 35.00 lbs. |

Back Surface covering material

| | |
|---|---|
| Material | sand |
| wt./100 sq. ft. | no requirement |
| Wt./Sq. | 12.00 lbs. |
| Total lbs./Sq. | 158.02 lbs. |

TABLE 9

Example 8

Mat (felt)

| | |
|---|---|
| Material | mineral & acrylic coated fiberglass mat, one side |
| wt./100 sq. ft. | 12.00 lbs. |
| Wt./Sq. | 28.80 lbs. |

Asphalt

| | |
|---|---|
| wt./100 sq. ft. | 9.00 lbs. |
| Wt./Sq. | 21.60 lbs. |

Asphalt Filler

| | |
|---|---|
| Material | limestone |
| Filler Percentage | 65% |
| Wt./Sq. | 40.11 lbs. |

Exposed Surface Covering Material

| | |
|---|---|
| Material | grade 11 mineral granules |
| wt./100 sq. ft. | 25.00 lbs. |
| Wt./Sq. | 25.00 lbs. |

Headlap surface covering material

| | |
|---|---|
| Material | grade 11 mineral granules |
| wt./100 sq. ft. | 25.00 lbs. (min.) |
| Wt./Sq. | 35.00 lbs. |

Back Surface covering material

| | |
|---|---|
| Material | n/a |
| wt./100 sq. ft. | no requirement |
| Wt./Sq. | 0.00 lbs. |

| | |
|---|---|
| Total lbs./Sq. | 150.51 lbs. |

TABLE 10

Example 9

Mat (felt)

| | |
|---|---|
| Material | non-woven fiberglass |
| wt./100 sq. ft. | 1.55 lbs. |
| Wt./Sq. | 3.72 lbs. |

Asphalt

| | |
|---|---|
| wt./100 sq. ft. | 10.50 lbs. |
| Wt./Sq. | 25.20 lbs. |

Asphalt Filler

| | |
|---|---|
| Material | limestone |
| Filler Percentage | 65% |
| Wt./Sq. | 46.80 lbs. |

Exposed Surface Covering Material

| | |
|---|---|
| Material | aluminum flakes |
| wt./100 sq. ft. | 3.00 lbs. |
| Wt./Sq. | 3.00 lbs. |

Headlap surface covering material

| | |
|---|---|
| Material | polymer film |
| wt./100 sq. ft. | 1.50 lbs. |
| Wt./Sq. | 2.10 lbs. |

Back Surface covering material

| | |
|---|---|
| Material | polymer film |
| wt./100 sq. ft. | 1.50 lbs. |
| Wt./Sq. | 3.60 lbs. |

| | |
|---|---|
| Total lbs./Sq. | 84.42 lbs. |

TABLE 11

Example 10

Mat (felt)

| | |
|---|---|
| Material | non-woven fiberglass |
| wt./100 sq. ft. | 1.55 lbs. |
| Wt./Sq. | 3.72 lbs. |

Asphalt

| | |
|---|---|
| wt./100 sq. ft. | 7.50 lbs. |
| Wt./Sq. | 18.00 lbs. |

Asphalt Filler

| | |
|---|---|
| Material | limestone |
| Filler Percentage | 60% |
| Wt./Sq. | 27.00 lbs. |

Exposed Surface Covering Material

| | |
|---|---|
| Material | textured & painted polymer film |
| wt./100 sq. ft. | 3.50 lbs. |
| Wt./Sq. | 3.50 lbs. |

Headlap surface covering material

| | |
|---|---|
| Material | polymer film |
| wt./100 sq. ft. | 1.50 lbs. |
| Wt./Sq. | 2.10 lbs. |

Back Surface covering material

| | |
|---|---|
| Material | polymer film |
| wt./100 sq. ft. | 1.50 lbs. |
| Wt./Sq. | 3.60 lbs. |

| | |
|---|---|
| Total lbs./Sq. | 57.92 lbs. |

All of the above examples have a lighter total weight than the prior art D3462 shingle (57.92 to 166.85 pounds per square compared to 195.24). This is a result of the lighter-weight materials used in their construction.

Furthermore, roofing material of the disclosed subject matter conform to the AC438 standard, which includes some of the physical requirements of the D3462 specification such as dimensions and pliability, but replaces several of the D3462's physical requirements with performance requirements. The performance requirements of the AC438 standard include, for example: wind resistance, which are a minimum of either ASTM D 7158 Class D or, alternatively, ASTM D 3161 Class A; fire rating of at least ASTM E 108 or UL790, Class C; weather resistance, after testing of which, according to ASTM G 155, the weathered specimens show no visual signs of surfacing material loss, cracks, erosion or exposed felt substrate; temperature cycling, after testing of which the specimens do not show signs of tearing or cracking of the filled asphalt coating that exposes the reinforcing felt of the shingle, or separation greater than ¼ inch (6.4 mm) at the joints between the specimens, and there are no signs of tearing of the shingle at the fastener locations or pull-through of the fasteners, and no portion of the asphalt-coated reinforcing felt breaks or separates from the specimens; wind-driven rain resistance, which is tested according to Florida Building Code Test Protocol TAS-100, after which any test specimen which exhibits water infiltration through the sheathing is considered as failing the wind-driven rain test, and any test specimen which has the prepared roof covering or any portion thereof "blow off," tear or blow upward without reseating during the test is considered as failing the wind driven rain test; and breaking strength after weathering, according to which the average breaking strength of weathered specimens is not less than 80 percent of the average breaking strength of unweathered specimens. A more detailed description of the AC438 requirements are found in the AC438 specification, which is hereby incorporated by reference in its entirety.

While the disclosed subject matter is described herein in terms of certain preferred and exemplary embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having other possible combinations of the features disclosed and claimed herein. As such, the particular features presented herein can be combined with each other in other manners within the scope of the disclosed subject matter such that the disclosed subject matter includes any suitable combination of the features disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the system and method of the disclosed subject matter without departing from the spirit or scope of the disclosed subject matter. Thus, it is intended that the disclosed subject matter include modifications and variations that are within the scope of the appended claims and their equivalents.

What is claimed is:

1. A roofing material comprising:
a first covering material comprising fines,
wherein the first covering material is configured to be an uppermost surface of when the roofing material is installed on a roof deck;
a paint on at least a portion of the fines;
a first asphalt layer comprising asphalt and an asphalt filler;
a fiberglass mat,
wherein the first asphalt layer is between the first covering material and the fiberglass mat;
a second asphalt layer comprising asphalt and an asphalt filler,
wherein the fiberglass mat is between the first asphalt layer and the second asphalt layer;
a polymer layer attached to the second asphalt layer; and
a second covering material in direct contact with the second asphalt layer, the second covering material comprising sand.

2. The roofing material of claim 1, wherein the roofing material is a roofing shingle.

3. The roofing material of claim 1, wherein the roofing material is at least one of a strip shingle, a three-tab shingle, a laminated shingle, an architectural shingle, or a hip and ridge shingle.

4. The roofing material of claim 1, wherein the polymer layer comprises a polyethylene film.

5. The roofing material of claim 1, wherein a fire rating of the roofing material is Class A when tested according to at least one of ASTM E 108 or UL 790.

6. A roofing material comprising:
a first covering material comprising fines,
wherein the first covering material is configured to be an uppermost surface of when the roofing material is installed on a roof deck;
a paint on at least a portion of the fines;
a first asphalt layer comprising asphalt and an asphalt filler;
a fiberglass mat,
wherein the first asphalt layer is on positioned of on a surface of the fiberglass mat;
a second asphalt layer comprising asphalt and an asphalt filler,
wherein the second asphalt layer is positioned on a surface of the fiberglass mat which is opposite the surface on which the first asphalt layer is positioned;
a polymer layer attached to the second asphalt layer; and
a second covering material in direct contact with the second asphalt layer, the second covering material comprising granules.

7. The roofing material of claim 2, wherein the polymer layer comprises a polyethylene film.

8. The roofing material of claim 6, wherein the roofing material is a roofing shingle.

9. The roofing material of claim 6, wherein the roofing material is at least one of a strip shingle, a three-tab shingle, a laminated shingle, an architectural shingle, or a hip and ridge shingle.

10. The roofing material of claim 6, wherein the polymer layer comprises a polyethylene film.

11. The roofing material of claim 6, wherein the granules comprise one or more of minerals, plastic, metal, cement, clay, glass, ceramics, wood, composite, sand, or combinations thereof.

12. The roofing material of claim 6, wherein a fire rating of the roofing material is Class A when tested according to at least one of ASTM E 108 or UL 790.

13. The roofing material of claim 8, wherein the polymer layer comprises a polyethylene film.

14. A system, comprising:
a roof deck; and
a roofing material installed on the roof deck, the roofing material comprising:
a first covering material comprising fines,
wherein the first covering material is an uppermost surface of the roofing material on the roof deck;
a paint on at least a portion of the fines;
a first asphalt layer comprising asphalt and an asphalt filler;
a fiberglass mat,
wherein the first asphalt layer is between the first covering material and the fiberglass mat;
a second asphalt layer comprising asphalt and an asphalt filler,
wherein the fiberglass mat is between the first asphalt layer and the second asphalt layer;
a polymer layer attached to the second asphalt layer; and
a second covering material in direct contact with the second asphalt layer, the second covering material comprising granules.

15. The system of claim 14, wherein the roofing material is a roofing shingle.

16. The system of claim 14, wherein the roofing material is at least one of a strip shingle, a three-tab shingle, a laminated shingle, an architectural shingle, or a hip and ridge shingle.

17. The system of claim 14, wherein the polymer layer comprises a polyethylene film.

18. The system of claim 14, wherein the granules comprise one or more of minerals, plastic, metal, cement, clay, glass, ceramics, wood, composite, sand, or combinations thereof.

19. The system of claim 14, further comprising a color coating disposed on the first covering material.

20. The system of claim 15, wherein the polymer layer comprises a polyethylene film.

* * * * *